United States Patent Office 2,907,788
Patented Oct. 6, 1959

2,907,788

1,4a - DIMETHYL-7-OXO-8-HYDROXY-1,2,3,4,4a,4b,5, 6,7,9,10,10a-DODECAHYDROPHENANTHRENE-1-CARBOXYLATES

Willard M. Hoehn, Wilmette, Ill., assignor to G. D. Searle & Co., Chicago, Ill., a corporation of Delaware No Drawing. Application January 6, 1958
Serial No. 707,143

2 Claims. (Cl. 260—468.5)

The present invention relates to esters of derivatives of neoabietic acid and more particularly to the lower alkyl esters of 1,4a-dimethyl-7-oxo-8-hydroxy-1,2,3,4,4a, 4b,5,6,7,9,10,10a - dodecahydrophenanthrene - 1 - carboxylates which can be represented by the structural formula

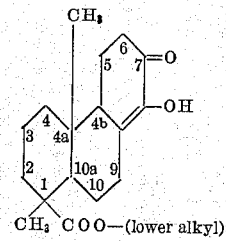

The lower alkyl group in the foregoing structural formula can represent methyl, ethyl, straight-chain and branched propyl, butyl, amyl, and hexyl.

Harris and Sanderson (Journal American Chemical Society, vol. 70, p. 342, 1948) have described the synthesis of 1,4a-dimethyl-7-oxo-1,2,3,4,4a,4b,5,6,7,9,10,10a-dodecahydrophenanthrene-1-carboxylic acid from neoabietic acid. The methyl ester, according to their directions, can be prepared in the usual manner with diazomethane. Higher alkyl esters are also made by conventional esterification procedures, e.g. by heating with an excess of the alkanol in the presence of hydrochloric acid.

These esters are then treated with hydrogen peroxide and alkali by cautious addition to yield the esters of 1,4a - dimethyl - 7-oxo-8,8a-epoxyperhydrophenanthrene-1-carboxylic acid. The esters of 1,4a-dimethyl-7-oxo-8,8a - epoxyperhydrophenanthrene-1-carboxylic acid, on heating with formic acid, yield the corresponding esters of 1,4a-dimethyl-7-oxo-8-hydroxy-1,2,3,4,4a,4b,5,6,7,9,10, 10a-dodecahydrophenanthrene-1 - carboxylic acid. The resulting esters are useful pharmaceutical agents, particularly as local anesthetics. On topical administration in a vehicle such as a corn oil solution they prevent erythemal effects due to excessive exposure to ultraviolet light.

The invention will be described in further detail in the following examples which are presented for illustration only and are not to be construed as limiting the invention in spirit or in scope. In these examples quantities are given in parts by weight.

Example 1

To 9 parts of the methyl ester of 1,4a-dimethyl-7-oxo-1,2,3,4,4a,4b,5,6,7,9,10,10a - dodecahydrophenanthrene-1-carboxylic acid in 300 parts of methanol at 15° C. are added portionwise 54.5 parts of 4-N sodium hydroxide solution and simultaneously and portionwise, 48.6 parts of 30% hydrogen peroxide solution from a separate addition funnel. The mixture is stirred while the reagents are added, stored for 15 hours in a refrigerator, and then poured into 200 parts of benzene, after which 200 parts of ice water and 50 parts of rock salt are added. The aqueous layer is separated and extracted exhaustively with benzene. The combined benzene solutions are washed with water to neutrality, dried over anhydrous calcium sulfate, filtered and freed from solvent under reduced pressure. The residual oil is dissolved in ether and, after evaporation of most of the ether, petroleum ether is added. A crystalline precipitate is obtained which is collected on a filter and washed successively with petroleum ether and ether, and recrystallized from dilute methanol. The methyl ester of 1,4a-dimethyl-7-oxo - 8,8a-epoxyperhydrophenanthrene-1-carboxylic acid melts at about 105–107° C.

Example 2

A mixture of 0.8 part of the methyl ester of 1,4a-dimethyl-7-oxo-8,8a-epoxyperhydrophenanthrene - 1 - carboxylic acid and 10 parts of 98% formic acid are heated under reflux for forty minutes. The reaction mixture is then poured into 150 parts of water and extracted with ether. The ether solution is washed with water, 5% sodium carbonate solution and again with water until the washings are neutral. The ether solution is dried over sodium sulfate, filtered and concentrated under vacuum. The residue is taken up in benzene and applied to a column containing 80 parts of silica gel. The column is developed with benzene solutions containing increasing amounts of ethyl acetate. Elution wtih a 5% solution of ethyl acetate in benzene and concentration of the eluate gives a residue which, crystallized from methanol and vacuum dried, melts at about 116–118° C. An ultraviolet absorption maximum is observed at 276 millimicrons with a molecular extinction coefficient of 11,000. Infrared absorption maxima are observed at 2.96, 5.82, 6.04, 6.14, 7.24, 8.01, 8.56, and 8.81 microns. The methyl ester of 1,4a-dimethyl-7-oxo-8-hydroxy-1,2,3,4,4a, 4b,5,6,7,9,10,10a - dodecahydrophenanthrene-1-carboxylic acid thus obtained has the structural formula

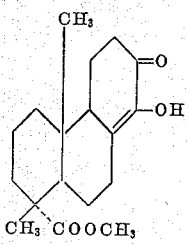

Example 3

Substitution of the ethyl ester of 1,4a-dimethyl-7-oxo-1,2,3,4,4a,4b,5,6,7,9,10,10a - dodecahydrophenanthrene-1-carboxylic acid in the procedure of Example 1 yields the ethyl ester of 1,4a-dimethyl-7-oxo-8,8a-epoxyperhydrophenanthrene-1-carboxylic acid. This compound shows infrared maxima at 5.81–5.82, 7.26, 8.02, 11.44 and 12.50 microns.

A mixture of 1 part of the resulting ethyl ester and 10 parts of 98% formic acid is refluxed for one hour and then poured into water and extracted with ether. The ether solution is washed successively with water, dilute potassium carbonate solution and again with water to neutrality, dried over anhydrous calcium sulfate, filtered and evaporated. The residue is taken up in benzene and thus applied to a silica gel chromatography column. The column is eluated with benzene and then with 1,3 and 5% solutions of ethyl acetate and benzene. Elution with a 5% ethyl acetate solution yields an eluate which, on concentration, yields the ethyl ester of 1,4a-dimethyl - 7-oxo-8-hydroxyl-1,2,3,4,4a,4b,5,6,7,9,10,10a-dodecahydrophenanthrene-1-carboxylic acid. The ultraviolet absorption spectrum as determined in methanol shows a maximum at about 276 millimicrons with a molecular extinction coefficient of 11,400. Infrared maxima are observed at about 2.95, 5.8, 6.05, 6.15. 7.25, 8.56 and 8.81 microns; a shoulder is observed at about 6.05 microns.

What is claimed is:

1. A lower alkyl ester of 1,4a-dimethyl-7-oxo-8-hydroxy - 1,2,3,4,4a,4b,5,6,7,9,10,10a - dodecahydrophenanthrene-1-carboxylic acid.

2. The methyl ester of 1,4a-dimethyl-7-oxo-8-hydroxy-1,2,3,4,4a,4b,5,6,7,9,10,10a - dodecahydrophenanthrene-1-carboxylic acid.

References Cited in the file of this patent

UNITED STATES PATENTS

| | | |
|---|---|---|
| 2,750,406 | Richie | June 12, 1956 |
| 2,796,431 | Bible et al. | June 18, 1957 |